(12) United States Patent
Dalton (10) Patent No.: US 8,277,525 B2
(45) Date of Patent: Oct. 2, 2012

(54) HIGH ENERGY TRANSPORT GAS AND METHOD TO TRANSPORT SAME

(76) Inventor: Robert C. Dalton, Easley, SC (US)

( * ) Notice: Subject to any disclaimer, the term of this patent is extended or adjusted under 35 U.S.C. 154(b) by 552 days.

(21) Appl. No.: 10/910,174

(22) Filed: Aug. 2, 2004

(65) Prior Publication Data

US 2005/0000163 A1    Jan. 6, 2005

Related U.S. Application Data (63) Continuation-in-part of application No. 10/360,692, filed on Feb. 7, 2003.

(51) Int. Cl.
*C01B 3/36* (2006.01)
*C01B 3/24* (2006.01)
*C01B 6/24* (2006.01)
*C10K 3/06* (2006.01)
*C10J 3/00* (2006.01)

(52) U.S. Cl. ......... 48/197 R; 48/202; 48/210; 48/198.1; 423/644

(58) Field of Classification Search .................... 48/210, 48/197 R, 198.1; 423/644
See application file for complete search history.

(56) References Cited

U.S. PATENT DOCUMENTS

| | | | |
|---|---|---|---|
| 2,028,014 A * | 1/1936 | Reinecke | 204/170 |
| 2,080,767 A * | 5/1937 | Dreyfus | 585/534 |
| 4,527,003 A * | 7/1985 | Okamoto et al. | 585/648 |
| 4,574,038 A | 3/1986 | Wan | |
| 4,858,441 A | 8/1989 | Wheatley | |
| 4,953,366 A | 9/1990 | Swift | |
| 5,015,349 A | 5/1991 | Suib | |
| 5,072,990 A * | 12/1991 | Vogt et al. | 299/4 |
| 5,131,993 A | 7/1992 | Suib | |
| 5,277,773 A | 1/1994 | Murphy | |
| 5,328,577 A | 7/1994 | Murphy | |
| 5,472,581 A | 12/1995 | Wan | |
| 5,581,986 A * | 12/1996 | Calver | 56/12.7 |
| 5,852,143 A * | 12/1998 | Sishta et al. | 526/127 |
| 5,900,521 A | 5/1999 | Park | |
| 5,972,175 A | 10/1999 | Tanner | |
| 6,085,512 A | 7/2000 | Agee | |
| 6,344,491 B1 | 2/2002 | Beer | |

* cited by examiner

*Primary Examiner* — Matthew Merkling
(74) *Attorney, Agent, or Firm* — Laurence P. Colton (57) ABSTRACT

A high energy transport gas and a method to transport the high energy transport gas are used to increase the energy content of a pipeline and other vessels that are designed to carry natural gas under ambient conditions, in a compressed state or in a liquefied state. Methane and other gases are used as the feedstock, with methane from natural gas fields, coal beds or derived from hydrogen reacting with coal being primary energy sources. Also, this gas and method can provide an abundant source for hydrogen production, and the energy from hydrogen can be used for fuel cell applications that generate electricity and power motor vehicles. This gas and method are capable of increasing the energy capacity of current natural gas pipelines and other storage and transport vessels.

16 Claims, 9 Drawing Sheets

HIGH ENERGY TRANSPORT GAS AND METHOD TO TRANSPORT SAME

STATEMENT OF RELATED APPLICATIONS

This application is a continuation-in-part of U.S. patent application Ser. No. 10/360,692, having a filing date of 7 Feb. 2003.

BACKGROUND OF THE INVENTION

1. Technical Field

This invention relates generally to a method of transportation of energy and more specifically to a method of transportation of energy and a high-energy transport gas that increases the amount of energy in a pipeline or transportation vessel designed to carry methane and other gases with low heats of combustion. This invention further relates generally to a high energy transport product and more specifically to a high energy transport gas having a higher heat of combustion than methane.

2. Prior Art

Natural gas, often commonly referred to as methane, is a worldwide source of energy. Natural gas varies in composition from country to country as well as from region to region within a specific country. A natural gas composition at the wellhead typically contains over 85% methane. Some natural gas compositions at the wellhead can contain over 96% methane. Although the terms natural gas and methane often are used interchangeably, typically, natural gas will contain some ethane (a $C_2$ hydrocarbon), propane (a $C_3$ hydrocarbon) and Butane (a $C_4$ hydrocarbon). Table 1 illustrates common compositions of natural gas exports of various countries.

TABLE 1

Natural Gas Export Compositions from Select Countries

|  | Trinidad | Algeria | Oman | N. America | Norway | Qatar | Nigeria |
| --- | --- | --- | --- | --- | --- | --- | --- |
| HHV BTU/SCF | 1048 | 1103 | 1168 | 1096 | 1087 | 1132 | 1125 |
| Composition |  |  |  |  |  |  |  |
| Methane | 96.13% | 89.57% | 86.52% | 92.77% | 91.94% | 89.18% | 89.07% |
| Ethane | 3.40% | 8.61% | 8.315 | 3.36% | 5.44% | 7.07% | 7.67% |
| Propane | 0.39% | 1.18% | 3.32% | 1.51% | 1.97% | 2.50% | 2.98% |
| Butane | 0.07% | 0.31% | 1.70% | 0.88% | 0.235 | 1.155 | 0.34% |

In Table 1, HHV is the high heat value of the gas that is measured in British Thermal Units per standard cubic feet (Btu/scf). The high heat value is determined by the natural gas compositions. Natural gas composition that contains relatively large amounts of ethane, propane and butane have greater high heat values (HHV) compared to natural gas compositions that are richer in methane.

Depending upon national policy, local economics and contractual agreements for natural gas purchases, the component gas of ethane, propane, butane and other compounds with a greater heat of combustion than methane may be removed from the wellhead natural gas composition prior to export. The ethane, propane, butane and other compounds can be used to manufacture other petrochemical products and plastics. For example, in Table 1, Trinidad removes much of the ethane, propane and butane for Trinidad's local petrochemical and plastics industries, and a natural gas mixture of greater than 96% methane with a HHV of 1048 (Btu/scf) is exported. Similarly, the North American market removes some ethane, propane and butane prior to transporting and distributing a natural gas mixture to the market place. Processed North American natural gas typically contains over 96% methane and has a HHV of 1029 (Btu/scf). Other countries such as Japan use a gas for commercial distribution having a HHV of over 1330 (Btu/scf). The economic differences for natural gas transport between Japan and North American are discussed below.

In recent years, natural gas has been a growing source of energy for the in the world economy. The future consumption of natural gas for energy needs is projected to grow at a fast pace. For example, the United States Department of Energy (USDoE) stated that the projected use of natural gas as an energy source in the US would grow dramatically as a fuel for the production of electricity. Demand for natural gas for electricity production is expected to rise 90% between 2001 and 2020. However, many bottlenecks exist in natural gas pipelines throughout the US and the world and natural gas pipelines between the US and Canada are at capacity. See "Reliable, Affordable, and Environmentally Sound Energy for America's Future", Report of the National Energy Policy Development Group of the US. Many nations including Japan, the European Union (EU) and the US are developing transportation vehicles fueled by hydrogen. The demand for natural gas and hydrogen is driven by current and future environmental, economic and national security concerns.

Electricity generation in the world is dominated by coal; however, the future of electricity generation is projected to have a growing demand for natural gas. Today, electricity generation in the US is approximately 52% coal, 20% nuclear, 16% natural gas, 7% hydroelectric, and the balance from oil and renewable energy sources such a wind, solar and biomass. By 2020, the USDoE projects that the US will become more dependent on energy from natural gas for electricity, transportation, industrial processing, and home heating. Electricity from natural gas will increase from today's 16% of generation to 33% of the generation by the year 2020.

For electricity production, natural gas (methane) is considered an abundant source of energy, is environmentally advantageous over coal, is more energy efficient for electricity production with lower-capital equipment costs and shorter construction lead times for electricity plants, and is favored by power generation companies due to changes in the economics of electricity generation. Natural gas (methane) is an abundant natural resource for energy within the US and around the world. Estimates of natural gas reserves around the world are large. Estimates of quantities of known stranded gas reserves have been identified by synthetic fuel manufactures such as Syntroleum, Inc., which places the quantity of these stranded gas reserves to be equivalent to the oil reserves of Saudi Arabia, if these reserves were converted from methane gas to hydrocarbon liquids fuels. These reserves would provide hydrocarbon liquid fuel from Fischer-Tropsch synthesis methods that could provide fuel for all the cars and trucks in the US for over 80 years. Other methods for methane production include reacting hydrogen with coal.

Besides its abundance for an energy source, natural gas (methane) is sought after for environmental, economical and energy efficiency reasons. Shifting energy sources for electricity generation to natural gas (methane) provides many environmental advantages compared to coal and nuclear sources. When methane is used as a primary source for electricity and energy produced by gas turbines, electricity generation produces fewer emissions that lead to pollution and poor air quality, compared to coal. Unlike coal, electricity generation from natural gas fired gas turbines produces low emissions of nitrogen oxides ($NO_x$) and sulfur dioxides ($SO_2$) and virtually no emissions of organic particulates, chloride, fluorides, mercury, hazardous metals, and other pollutants. In addition, electricity production from methane produces less carbon dioxide ($CO_2$) emissions than coal. Carbon dioxide emissions are considered among many in the scientific community to cause global warming. Generation of electricity from nuclear energy produces no pollutant or carbon dioxide emissions, but the byproducts from fuel preparation and spent fuel creates environmental hazards. The nuclear fuel manufacturing process introduces a large number of environmentally hazardous chemical and isotopes into the environment, and spent fuel contains highly radioactive byproducts that can last thousands of years.

Another environmental advantage of electricity production from methane compared to coal is that electricity is produced more energy efficiently from natural gas turbines. Electricity generation from natural gas can be very energy efficient. Natural gas fired turbines can produce electricity with and without cogeneration. Cogeneration can produce either steam or steam and electricity from steam turbines. Cogeneration, also known as combined heat and power (CHP), can achieve efficiencies of greater than 80%, whereas the newest coal-burning power plant can achieve efficiencies of only slightly over 40%. However, most conventional coal fired power plants operate at approximately 30% efficiency.

The future demand for natural gas (methane) energy is not just being driven by electricity demand. Energy consumption from methane accounts for 24% of the total energy used in the US. Natural gas is a feedstock for many products and a source of energy for many manufacturing processes. These products include textiles, chemicals, rubber, and furniture. Manufacturing processes that rely heavily on natural gas include brick making, glass making, and paper production. Residential heating produces a great demand for energy from natural gas, also.

According to the Report of the US National Energy Policy Development Group:

Between 2000 and 2020, US natural gas demand is projected by the Energy Information Administration to increase by more than 50 percent, from 22.8 to 34.7 trillion cubic feet. Others such as the Cambridge Energy Research Associates expect gas consumption to increase by about 37 percent over that period. Growth is projected in all sectors—industrial, commercial, residential, transportation, and electric generation. More than half of the increase in overall gas consumption will result from a rising demand for electricity generation.

The report further cites current and future problems associated with getting methane's energy to the market place:

To meet this long-term challenge, the United States not only needs to boost production, but also must ensure that the natural gas pipeline network is expanded to the extent necessary. For example, although natural gas electricity generation in New England is projected to increase by 16,000 MW through [2020], bottlenecks may block the transmission of necessary supplies. Unless pipeline constraints are eliminated, they will contribute to supply shortages and high prices, and will impede growth in electricity generation.

The report further cites that:

The current domestic natural gas transmission capacity of approximately 23 trillion cubic feet (tcf) will be insufficient to meet the projected 50 percent increase in US consumption projected for 2020. Some parts of the country such as California and New England, already face capacity shortage. . . . [D]elays have constrained the ability to transport natural gas to California, contributing to high prices. In addition, the natural gas pipeline connections from Canada are near capacity, so any greater US reliance on Canadian natural gas will require increase pipeline capacity.

Transportation of natural gas (methane) energy is cited as one of the major hurdles for meeting the projected demands for natural gas. The expected increase in the demand for methane energy is expected to require 263,000 miles of distribution pipelines and 38,000 miles of new transmission pipelines. Construction of these miles of pipelines will face obstacles. These obstacles include, but are not limited to, encroachment on existing rights-of-ways and heightened community resistance to pipeline construction.

Liquefying methane is one method to increase methane energy density for transportation of the methane energy. By liquefying natural gas, the energy that is contained in one thousand cubic meters ($1000 \text{ m}^3$) of methane gas at standard temperature and pressure (STP) is compressed into approximately a volume of one cubic meter ($1 \text{ m}^3$) in the liquid state of methane. Liquefied natural gas (LNG) can be transported through pipelines or transported by specially designed ships. Such ships commonly transport liquefied natural gas. Transportation by ship uses liquefied natural gas to increase the energy density of the storage volume of the ship increasing the amount of energy that the ship can carry. This above stated increase demand for methane energy to generate electricity could require a substantial demand for LNG imports. The current demand for methane energy has begun to demonstrate this trend. The current US market in the New England region has seen a 350% increase in imports of LNG by ship between 1998 and 1999. Several companies have considered reopening terminals in the state of Georgia and the state of Maryland to import LNG. Other petroleum companies have announced plans for creating terminals to import LNG.

Conventional facilities for liquefying methane tend to be quite large and expensive to build. Hundreds of millions of US dollars are typically required to build a LNG process facility. Newer technology has decreased the cost of LNG processing facilities. One such new technology is small, natural gas driven compressors invented by the USDoE at Los Alamos National Laboratory (LANL). The technology is called thermoacoustic natural gas liquefaction. Among patents for this technology are U.S. Pat. No. 4,953,366 and U.S. Pat. No. 4,858,441. This technology is also known as Thermoacoustic Sterling Hybrid Engine Refrigerator (TASHER).

The USDoE and its industrial partners have spent over US$20 million to demonstrate this thermoacoustic technology. The technology is quite small and effective for liquefying natural gas. The main markets for this technology are liquefying methane on drilling platforms at sea for transporting by ship, liquefying stranded coal bed methane for transportation by pipeline, rail car or truck, and liquefying natural gas at the end of pipe, end of line or at the market locations to increase the energy content of fuel containers that are used for vehicle transportation that operate on methane energy.

Another prior art method to transport methane energy is to convert methane gas to liquid fuel using steam reforming with Fischer-Tropsch catalysts and autocatalytic oxidation of methane. This method is quite common to transport stranded methane gas and is sought after to increase the pressure on oil pipelines to transport oil from mature oil fields where oil production is declining. Stranded methane gas is methane gas that has no common economic means to be transported from remote locations to the market place. For example, locations where no pipelines exist to transport the natural gas to ports or the market place.

Gas to hydrocarbon liquid (gas to liquid, g to l) technologies and processes have received much attention by the USDoE to supplement the constant decline in oil from State of Alaska's North Slope with Fischer-Tropsch methods. The hydrocarbon liquid fuels derived from methane are intended to keep the pressure on the Alaskan Pipeline great enough to transport the remaining oil in the North Slope as production continues to decline. Other companies, such as Syntroleum, Inc., use autocatalytic oxidation of methane to produce liquid fuel with ultra-low sulfur contents as additive to common gasoline to meet new US Environmental Protection Agency (USEPA) sulfur standards for gasoline and conventional diesel fuels. Syntroleum, Inc. has received many US patents in this area, including U.S. Pat. No. 6,344,491 for a high-pressure autothermal oxidative catalytic process for methane and U.S. Pat. No. 6,085,512 for other Fischer-Tropsch technology.

Other methods and technologies to transform and transport methane energy by converting methane gas into a liquid hydrocarbon fuel by the USDoE and their industrial and university partners include Ion Transport Ceramic Membrane and Steady State and Transient Catalytic Oxidation and Coupling of Methane. See, for example, <www.fe.doc.gov/fuel/gas-to-liquids.shtml>.

Other methods to increase the amount of natural gas (methane) energy available to the market place use prior art that is associated with current energy policy and conventional energy transportation methods. These methods provide a reasonable, conventional solution to addressing the constraints of delivering methane energy to the market place. One method is to build more pipelines—distribution pipelines and transmission pipelines. One other is to increase the energy content of a natural gas pipeline by increasing the pressure of the gas in the pipeline. These conventional approaches would, as stated in the Report of the US' National Energy Policy Development Group, call for increasing the amount of energy supplied from natural gas (methane) by building tens of thousands of miles of new transmission pipelines and hundreds of thousands of miles of new distribution pipelines. The cost for the new infrastructure to transport the energy of methane is estimated to be well over US$10 billion.

Another method to transport the energy associated with natural gas (methane) is to convert the methane in natural gas to methanol. Methanol, a liquid alcohol, can increase the energy density of a pipeline, but a methanol energy economy would require drastic changes to a countries' energy infrastructure. Additionally, methanol is not an environmental friendly chemical. Methanol can poison ground water.

Other prior art contains end of the pipe, end of the line or at the market technology to process natural gas (methane). These technologies convert natural gas (methane) to chemical species for feedstock to other process for an end use. Such uses include feedstocks such as ethane and ethylene for plastics such as polyethylene and polypropylene. Other technologies are used to convert methane to acetylene as well as to use methane for gas to hydrocarbon liquid processes. These technologies employ processes that use catalysts, electromagnetic energy, non-thermal plasma and plasma initiators. Some technologies use these processing in combination with each other. These technologies use methane, coal, carbon sources, water and hydrogen as input chemicals species for producing feedstock chemical for industrial process. Methane can be processed with coal, a carbon species, or a carbon containing species. Methane also can be processed alone, with water, or with hydrogen or oxygen. Coal can be processed with hydrogen, water, or hydrogen with water.

These other end of the pipeline or at the market technology prior art processes include U.S. Pat. Nos. 5,328,577 and 5,277,773, which disclose the use of plasma initiators exited by microwave energy to convert methane and hydrogen to acetylene, ethylene, and ethane. U.S. Pat. No. 5,972,175 discloses the use of a catalyst heated with microwave energy to convert gaseous hydrocarbons, methane and propane, with char to synthesize higher order organic species including ethylene and acetylene. U.S. Pat. No. 4,574,038 discloses processing 100% methane with microwave energy and a metal catalyst to produce a product mixture of 51.3% ethylene, 21.8 methane and 26.7 hydrogen. U.S. Pat. No. 5,472,581 discloses the use of microwave energy to heat activated charcoal to react the charcoal with methane to produce ethane, ethylene and acetylene. Also, U.S. Pat. No. 5,472,581 discloses the use of microwave energy to heat activated charcoal with water to produce methane, ethane, ethylene and acetylene. U.S. Pat. No. 5,900,521 discloses creating a metal catalyst that uses a conventionally heated catalysts bed to convert methane to ethylene and hydrogen. U.S. Pat. Nos. 5,131,993 and 5,015,349 disclose the use of a non-thermal plasma, catalyst and microwave energy to synthesize higher order hydrocarbons from methane. Bool et al. have used microwave energy as a catalyst to react oxygen and methane to form ethylene, carbon monoxide and acetylene. Bool, C. J. et al, "The Application of Microwaves to the Oxidative Coupling of Methane over Rare-Earth Oxide Catalyst", source unknown, pp. 39-42, School of Chemistry, University of Hull, Hull, North Humberside, United Kingdom, HU67RX.

These many processes produce higher energy gases from methane, methane and coal, methane and water, methane and oxygen, methane and hydrogen, coal and hydrogen, and coal and water that have higher heats of combustion compared to methane and that have higher boiling points compared to methane. Compared to natural gas (methane) alone, these mixtures of gases have a lower number of moles if the hydrogen is removed from the mixture.

Even with these methods, there is a need for a more efficient method of transporting methane and other gases so to as to provide a higher energy content in a smaller volume of gas. It is to this need and other needs that the present invention is directed.

BRIEF SUMMARY OF THE INVENTION

1. A Method to Transport Energy

One aspect of this invention is to increase the amount of energy that can be transported through (1) a pipeline or (2) in a storage vessel by synthesizing high energy gases (HEG) from a lower energy gas, then transporting these higher energy gases through conventional energy transportation methods such as for example, but not limited to, gas pipelines, liquefied gas pipelines, high pressure vessel, etcetera. The invention involves the conversion of low energy gases such as methane and syngas (CO and $H_2$) to higher order molecules. These higher order gases have greater heats of combustion compared to methane and other gases and gas mixtures. Also, these high-energy gases have higher boiling points that would require less energy to condense them into a liquid.

The typical byproduct of synthesizing high energy gases is hydrogen ($H_2$). Hydrogen is consider an environmentally friendly source of energy, is a future source of energy for electricity from fuel cells and for a clean burning fuel source for motor vehicles, and supports the efforts of the US to build a hydrogen economy for energy. This invention addresses the current and projected shortfalls of infrastructure to transport an abundance of methane energy for the energy and environmental needs of the world, and addresses the future demands for a clean burning source of energy, such as hydrogen.

2. Transport Gas, Economic Diversification and Economic Benefit

This invention allows for countries and energy companies to diversify their products and develop new industries from a natural resource, natural gas. This invention has the potential to produce an increase in a country's gross domestic product and gross national product.

Currently, while the general trend for worldwide demand and production of natural gas is increasing, so is the diversification of products from natural gas. Natural gas is used for electricity generation using gas turbines that produce environmental benefits, have low capital cost and the desirable trait of addressing peak power demand with rapid on-line times. Another demand for natural gas is driven by gas to liquid products, diesel fuel, naphtha and other lubrications. Currently, Indonesia and Qatar have received combined investment totaling over US$20 billion dollar for gas to liquid facilities. Gas to liquid technology helps natural gas producing countries to diversify the product line from natural gas. This gas to liquid technology used produces a diesel fuel like liquid suitable for use in diesel engines alone or mixed with tradition diesel fuel to lower the sulfur content in diesel fuel. These low-sulfur fuels are desired in certain regions of the world to improve local air quality by reducing airborne sulfur-base particulates.

One benefit of this invention is that a natural gas producing country can diversify to other products that are produced by natural gas. Product diversity is provided by this invention by using gas to gas technology (g to g).

Another aspect of this invention is that a natural gas producing country can produce a gas for transport that is identified in this invention as a high energy transport gas. The high energy transport gas in this invention can produce a gas mixture that has a higher Btu content per unit volume with the exclusion of hydrogen gas ($H_2$) compared to the naturally occurring gas in a natural gas producing country, and at the same time produce hydrogen gas ($H_2$).

Another aspect of this invention is that this invention allows for hydrogen gas ($H_2$) to be produced without producing the global warming gas, carbon dioxide ($CO_2$). Typically, hydrogen can be produced by the optimized reaction below:

$$CH_4 + O_2 \rightarrow CO_2 + 2H_2 \quad \text{Equation (1)}$$

In Equation 1, the heat value of the carbon atom in methane ($CH_4$) is used, and a global warming gas, carbon dioxide ($CO_2$) is produced as a waste gas. In this invention, hydrogen is produced without using energy associated with the carbon atom. One example of several reactions that can produce hydrogen from this invention for a method to transport energy and that is a formula to produce a high energy transport gas is:

$$2CH_4 + \text{energy} \rightarrow H_2 + C_2H_6 \quad \text{Equation (2)}$$

In this invention, no global warming gas, carbon dioxide, is produced as a waste gas. The energy used to drive the reaction in Equation 2 can be renewable energy such as solar or wind. Also, excess capacity of daytime or nighttime conventionally produced electricity can be utilized for the reaction in Equation 2.

Another aspect of this invention allows for hydrogen gas ($H_2$) to be produced while preserving the heat of combustion of a carbon atom in reformed molecules and using the carbon atoms for molecules that are in the mixture of the high energy transport gas that is produced by this invention.

Another aspect of this invention is that this invention allows for natural gas producing countries to have a hydrogen economy in the native land while exporting high energy transport gas with a more profitable export economy due to more energy that can be contained in a pipeline or LNG ship with high energy transport gas as compared to conventional natural gas export economies. The hydrogen gas that is produced by making high energy transport gas can be used locally for the native economy. The hydrogen gas can be used to either generate electricity from fuel cells that have high energy efficiency, in reciprocating engines such as the BMW 700 series that operates on hydrogen gas and gasoline or in fuel cell cars. Automobiles that use fuels cells have a higher energy efficiency compared to conventional reciprocating engines.

Another benefit of this invention is that a natural gas producing country can diversify its products from natural gas by exporting hydrogen. Hydrogen can be exported in a sodium borate solution that has the same energy density as gasoline as demonstrated by a company called Millennium Cell, Inc. USA.

Another aspect of this invention is that this invention allows for natural gas producing countries to have a more profitable infrastructure of transporting and distributing natural gas for heating and electricity.

Another benefit of this invention for natural gas producing counties, that is not obvious with this method to transport energy and using high energy gas as an export, is that the potential for future local air pollution in natural gas producing countries can be reduced while having economic growth. This nonobvious aspect could be most beneficial for Middle Eastern countries, African countries and other regions that have dry, hot air temperature. Ozone formation occurs more favorable under dry, hot air temperature through interaction between sunlight and ozone precursor chemicals, volatile organic compounds (VOC) and nitrogen oxides ($NO_x$). Being that this invention can promote a hydrogen-based economy, local economies that use this invention would have less $NO_x$ from combustion of hydrocarbons and less evaporative emissions of VOCs from automobile, since hydrogen could be used as fuel.

Another benefit of this invention is the production of hydrogen with electricity from renewable energy, solar photovoltaic and wind turbines while providing economic benefit to other industries. Conventional techniques call for hydrogen production using solar photovoltaic methods or wind turbines by a method of electrolytic decomposition of water. In the Middle East, the German corporation BMW suggested that the Middle Eastern countries could export their hydrocarbons while developing domestic energy economies using solar voltaic powered electrolysis of water to produce hydrogen. While the electrolysis of water is one method, this invention would provide Middle Eastern countries with hydrogen for domestic consumption as well as provide additional economic benefits for transporting energy from use of the high energy transport gas of this invention.

Another aspect of this invention as an ancillary benefit is energy storage. Depending upon the daily energy cycle, consumption and energy economics of a country, this invention allows for hydrogen to be produced at night or during the day at low demand levels of electricity and stored. The stored energy could be utilized by fuel cells to produce electricity for peak demand during the day. An example of this is type of energy economics is found in parts of Western and Eastern Europe. Several countries in Western and Eastern Europe have a large amount of electricity generated by nuclear energy. At night, there is a low demand for electricity, and surplus electricity is abundant. Bulgaria and France are examples of countries that have this type of nuclear electricity economy. In these countries, natural gas or coal gas methane could be converted to high energy transport gas and hydrogen gas at night when electricity demand is low, and the hydrogen gas could be stored. During peak demands during the day, the stored hydrogen gas could be used to generated electricity from fuel cells.

Another benefit of this invention is better asset utilization and return on investment for natural gas transportation assets, such as a pipeline or an LNG ship. Better asset utilization is achieved with this method to transport energy and the use of high energy gas instead of the use of conventional natural gas because more energy per unit volume can be place in a pipeline or ship asset. The better asset utilization would result in a higher return on investment because more energy could be sold per unit volume of pipeline or ship.

Another benefit of this invention is that this invention allows for growth in demand for natural gas to occur without having to build more pipelines or more container ships to accommodate the growing demand of the consumer.

Another prior art method for transporting natural gas is demonstrated in the different methods between the Japanese and North American markets for transporting natural gas from a natural gas producing countries to these two different markets. Currently, a large portion of natural gas imports to the US come from Trinidad. In Japan, a large volume of natural gas is imported from Indonesia and other Asia exporting countries.

Trinidad separates out most hydrocarbon gases with carbon contents of $C_2$ and higher which have with higher heats of combustion compared to methane. These higher heats of combustion gases, $C_2$ and $C_3$ or higher hydrocarbons, remain in the natural gas producing countries for synthesizing higher value products that typically consist of petrochemicals and hydrocarbon polymer productions, while the lower heat value gas, primarily methane, is exported to North America for heat, electricity and industrial needs. This transported gas tends to have a heat value of 1047 Btu.

Alternatively, the Japanese market for natural gas uses a different economic structure. In Japan, gas that is transported through pipelines to serve energy needs for heat and electricity has a heat value of approximately 1330 Btu. The Japanese gas companies purchase natural gas from producer countries that have little to no purification of naturally occurring $C_2$ and $C_3$ or higher hydrocarbons from the source natural gas producing nation, resulting in a natural gas mixture that is transported in LNG container ships to Japan and through pipelines in Japan that generally has a heat value of greater than 1050 Btu. As a matter of practice, Japanese companies purchase propane and butane that has been separated out of natural gas from the wellhead, and subsequently add the propane and butane to the natural gas mixtures to produce a gas mixture in the Japanese transport and distribution pipelines that has a heat value of approximately 1330 Btu. Thus, the Japanese transport gas mixture has a heat value that is 27% higher than the North American transport gas (1330 Btu versus 1047Btu).

In Japan and North America, natural gas is sold to the end user, the consumer, based upon a Btu use charge. The Japanese gas companies transport gas at the higher heat value of 1330 Btu, allowing for the Japanese gas companies to increase the value of their pipeline content by filling the pipeline with and selling a naturally occurring gas mixture that is transported with a high Btu value compared to a naturally occurring mixture gas that has a methane content of over 99% after purification (such as used in North America). Thus, the Japanese economic structure for pipelines and gas transportation provides for more profits obtained from a pipeline through transportation and distribution charges because more energy is present in a pipeline. In other words, the Japanese economic structure for the transport of naturally occurring gas mixtures allows for more profit when compared to the same pipeline filled with gas in the North American economic structure for transport of naturally occurring gas mixtures that have been purified. Under the North American economic structure, pipelines would need approximately 27% more volume to carry the same Btu content in the transported gas, or for every four (4) natural gas pipelines in Japan, North America would need approximately five (5).

The transport gas in this invention allow for gas to have a higher heat value.

DETAILED DESCRIPTION OF THE PREFERRED EMBODIMENTS

The invention relates to a novel method to transport energy by forming high-energy gases (HEG) then transporting the HEG through conventional transportation means. The HEG is referred to in this invention as a high-energy transport gas. This transportation method allows for a greater amount of energy to be transported to an end use. As shown in the flow chart of FIG. 1, a source for conventional gases commonly used for providing energy is first treated by a means to synthesize HEG and then is transported through conventional and exiting transportation means to the end use of the energy. The source can be for illustrative purposes naturally occurring methane ($CH_4$), syngas (CO and $H_2$), a solid carbon source that is reacted with a gaseous or liquid species, methane produce by biomass decomposition, and methane produce from landfill decomposition. When the source is a solid carbon species, the carbon can be reacted with water ($H_2O$), methane ($CH_4$), carbon monoxide (CO), carbon dioxide ($CO_2$), or hydrogen ($H_2$). The carbon source for illustrative purposes can be coal, char, or biomass. HEG is a gas that is reformed from a carbon containing species with a heat of combustion that is less than or equal the heat of combustion of methane (890.9 KJ/mole), and the synthesized high energy gas has a heat of combustion that is greater than methane ($CH_4$). The HEG can be one gas or a mixture of gas.

Table 2 lists the heat of combustion for gases that could be used to synthesize HEG and gases that are HEGs. Carbon monoxide (CO), hydrogen ($H_2$), and methane ($CH_4$) are source gases used to form HEG. Acetylene ($C_2H_2$), ethylene ($C_2H_4$), ethane ($C_2H_6$), and propylene ($C_3H_6$) are HEGs. It is possible that other gases can be synthesized with heats of combustions that are greater than methane. These other gases are also HEGs, and it is understood that the above stated HEGs can be recycled into the means to synthesize HEG to reform the recycled gas into a HEG with heats of combustion greater than acetylene.

TABLE 2

| Gas | Heat of Combustion ($\Delta_c H$/KJmol-1) |
|---|---|
| Carbon Monoxide, CO | 283.0 |
| Hydrogen, $H_2$ | 285.8 |
| Methane, $CH_4$ | 890.8 |
| Acetylene, $C_2H_2$ | 1301.1 |
| Ethylene, $C_2H_4$ | 1411.2 |
| Ethane, $C_2H_6$ | 1560.7 |
| Propylene, $C_3H_6$ | 2058.0 |

Figure 1:
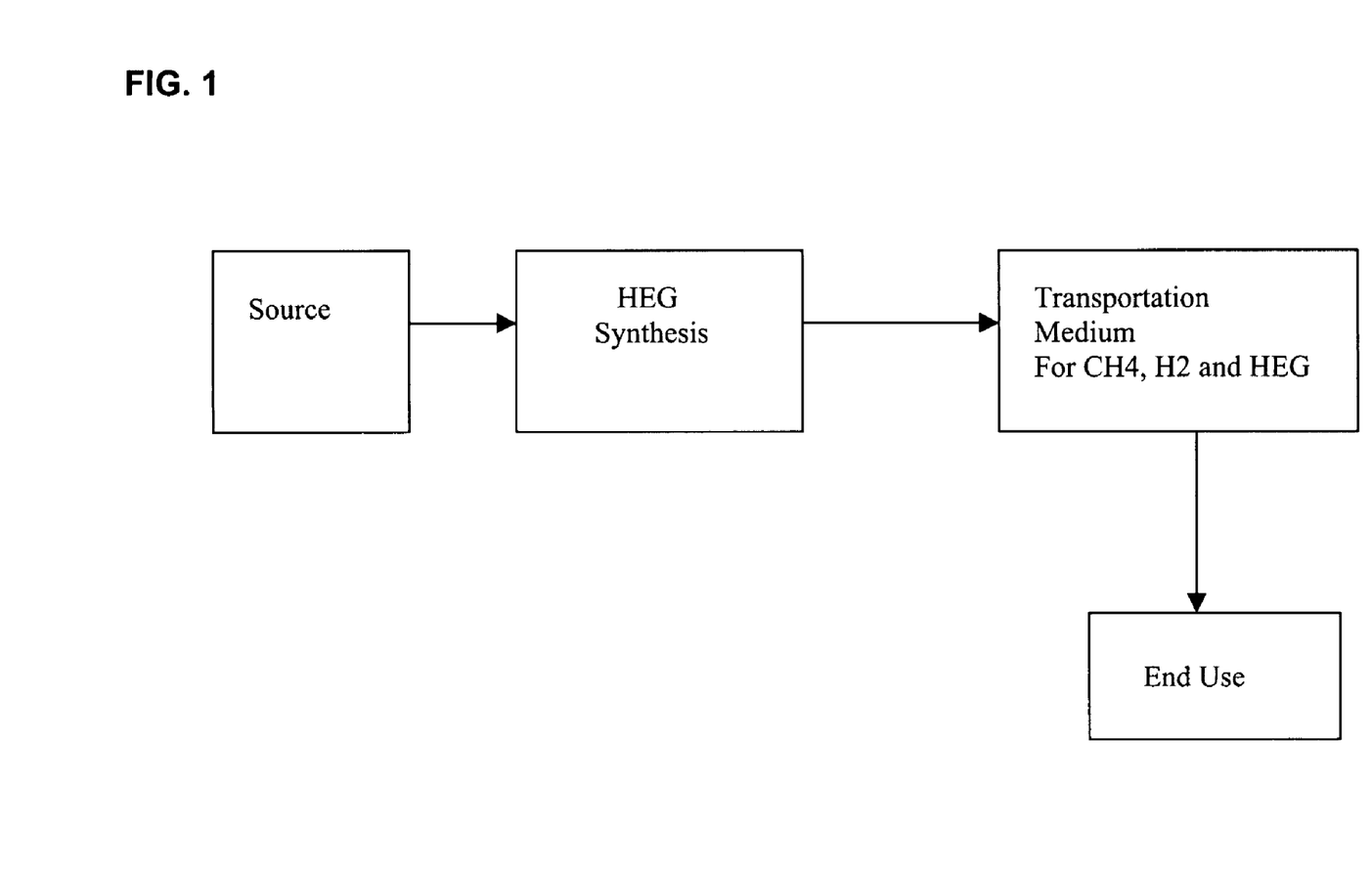
FIG. 1 is a flow diagram for the basic method for high energy gas (HEG) transport.

HEGs from source gases or source gases that are reacted with a solid carbon species can be synthesized by known means such as, for example purposes only and not limited to, those disclosed in U.S. Pat. Nos. 4,574,038, 5,972,175, 5,900,521, 5,131,993, 5,015,349, all of which are incorporated herein by reference. These methods include means that use autothermal catalysis, thermal catalysis, electromagnetic energy, plasma, steam reforming, and others. After the HEG is synthesized the HEG is transported to the end use or user as shown in FIG. 1. The transportation means are conventional transportation means and methods, including but not limited to transmission pipelines, distribution pipelines, high-pressure vessels, liquefaction, and other transportation and storage methods.

In this invention, HEG can be transported in a mixture with methane and hydrogen by conventional transportation means. This invention allows for a greater amount of energy to be transported by convention transportation means. Table 3 provides examples of mixtures of HEGs and the associated amount of energy with 10 moles of each mixture. Table 3 also provides a normalized energy content for the 10 moles of gases. The normalized energy content is normalized to the amount of energy from the conventional method of transporting gaseous energy in natural gas (methane). The total heat of combustion ($\Delta_c H^\circ_T$) for ten moles (10 mol.) of methane ($CH_4$) is 8909 KJ.

TABLE 3

| Gas Mixture Containing 10 Moles (Mol. of Each Gas) | Total Heat of Combustion ($\Delta_c H^\circ_T$) | Normalized Energy Content ($\Delta_c H^\circ_{T\text{-}Mixture}/\Delta_c H^\circ_{T\text{-}Methane}$) | Moles of Hydrogen ($H_2$) Produced |
|---|---|---|---|
| 10 Mol. of Methane, $CH_4$ | 8909 KJ | 1.00 | 0 |
| 7 Mol. of Methane, $CH_4$<br>3 Mol. of Ethylene, $C_2H_4$ | 10500 KJ | 1.18 | 6 |
| 5 Mol. of Methane, $CH_4$<br>5 Mol. of Ethylene, $C_2H_4$ | 11512 KJ | 1.29 | 10 |
| 3 Mol. of Methane, $CH_4$<br>7 Mol. of Ethylene, $C_2H_4$ | 12551 KJ | 1.41 | 14 |
| 10 Mol. of Ethylene, $C_2H_4$ | 14112 KJ | 1.58 | 20 |
| 3 Mol. of Methane, $CH_4$<br>3 Mol. of Acetylene, $C_2H_2$<br>4 Mol. of Ethylene, $C_2H_4$ | 12221 KJ | 1.37 | 17 |
| 2 Mol. of Methane, $CH_4$<br>2 Mol. of Acetylene, $C_2H_2$<br>4 Mol. of Ethylene, $C_2H_4$<br>2 Mol. of Propylene, $C_3H_6$ | 14145 KJ | 1.59 | 10 |

As shown in Table 3, this invention, which utilizes HEG mixtures for transporting energy, allows for a greater amount of energy to be transported by conventional means. When a HEG is mixed with methane, the resultant amount of energy is greater than 8909 KJ. The examples range from a mixture of 7 moles of methane with 3 moles of ethylene to 10 moles of ethylene to a mixture of 2 moles of methane with 2 moles of acetylene, 4 moles of ethylene and 2 moles of propylene. These mixtures have total heats of combustion for ten moles of gas that are greater than 10 moles of methane. The heats of combustion for these mixture range from 10500 KJ to 14125 KJ.

When the energy content of these HEG mixtures are normalized against the amount of energy for methane alone, the amount of energy ranges from 18% to 59% greater than methane alone. The greater amount of energy associated with HEG mixtures allows for more energy to be transported through existing conventional pipelines. As stated by the US Report of the National of the National Energy Policy Development Group, between the years 2000 and 2020 the demand for energy from natural gas is expected to rise between 37% and 50%. And according to this report, this increase in energy demand is expected to require over 38,000 miles of new transmission pipelines and 263,000 miles of new distribution pipelines, and this new pipeline construction is expect to cost well over US$10 billion.

As shown in Table 3, the use of HEG allows for more energy to be transported compared to conventional means, thus energy associated with mixtures of HEG can eliminate or substantially reduce the need for new pipelines resulting in saving billions of US dollars in pipeline construction. With HEG mixtures, more energy is transported more efficiently to the end users to meet growing energy demands without significantly increase the transportation infrastructure. This invention is similar to transmitting more data over optic fiber lines by increasing the capacity by using more that one frequency to transport data. Whereas multimode optics increase the capacity of single optic fiber, HEG increases the energy capacity of a pipeline or other convention transportation means (for example, a ship that carries LNG). This invention also has the potential to reduce the cost of electricity and home heating by reducing transmission costs by increasing the energy capacity of a pipeline.

An ancillary benefit of this invention is the abundant production of hydrogen for an energy economy based upon hydrogen. Hydrogen is expected to be in demand as an environmentally friendly energy fuel source for producing electricity from fuel cells and to power motor vehicles. As exemplified in Table 3, HEG mixtures with and without methane produce hydrogen. In these examples the HEG mixtures produce between 6 moles and 20 moles of hydrogen ($H_2$) based upon synthesizing 10 moles of the HEG mixture. The amount of hydrogen was obtained by converting methane to the HEG mixture. An example of a calculation for hydrogen produced is given below:

$$20CH_4 \rightarrow 2CH_4 + 2C_2H_2 + 4C_2H_4 + 2C_3H_6 + 10H_2 \quad \text{Equation (2)}$$

Or 20 mol. Methane→2 mol. methane+2 mol. Acetylene+4 mol. ethylene+2 mol. propylene+10 mol. hydrogen     Equation (4)

The reaction above can be produced by the mentioned HEG synthesis methods with a recycling of non-reformed methane through a reactor.

Another benefit from this invention is energy savings on liquefying gas. As shown in Table 4, the boiling point of the HEG is greater than methane. Acetylene, ethylene, ethane and propylene all have higher boiling points compared to methane. These higher boiling points would allow for a HEG or a mixture of HEGs without methane or hydrogen to be compressed into a liquid with less energy.

TABLE 4

| Gas | Boiling Point (° K) |
|---|---|
| Carbon Monoxide, CO | 81.6 |
| Hydrogen, $H_2$ | 20.28 |
| Methane, $CH_4$ | 111.6 |
| Acetylene, $C_2H_2$ | 188.4 |
| Ethylene, $C_2H_4$ | 169.4 |
| Ethane, $C_2H_6$ | 184.5 |
| Propylene, $C_3H_6$ | 225.5 |

Figure 2:
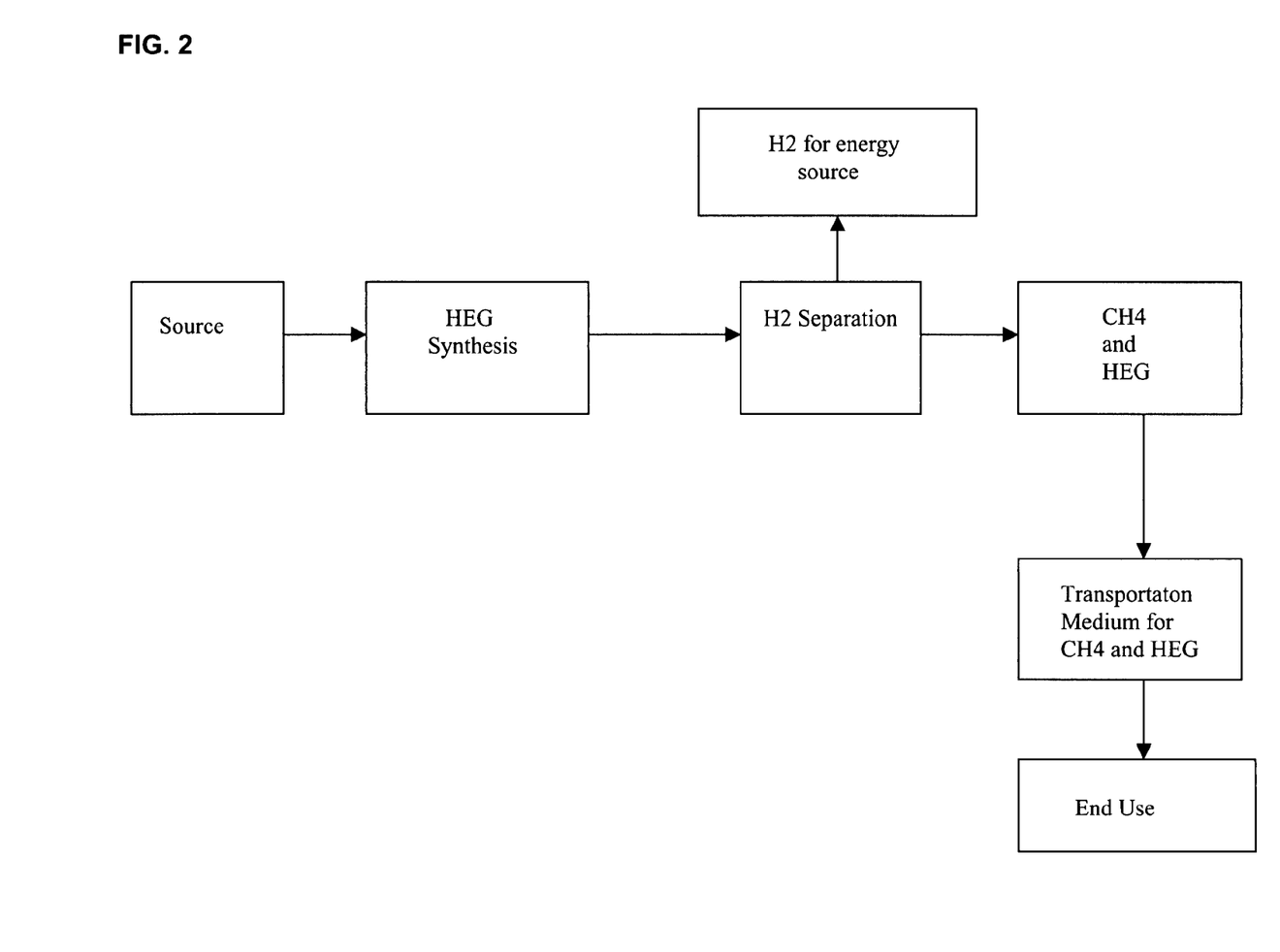
FIG. 2 is a flow diagram for high energy gas (HEG) transport with hydrogen separation.
Figure 3:
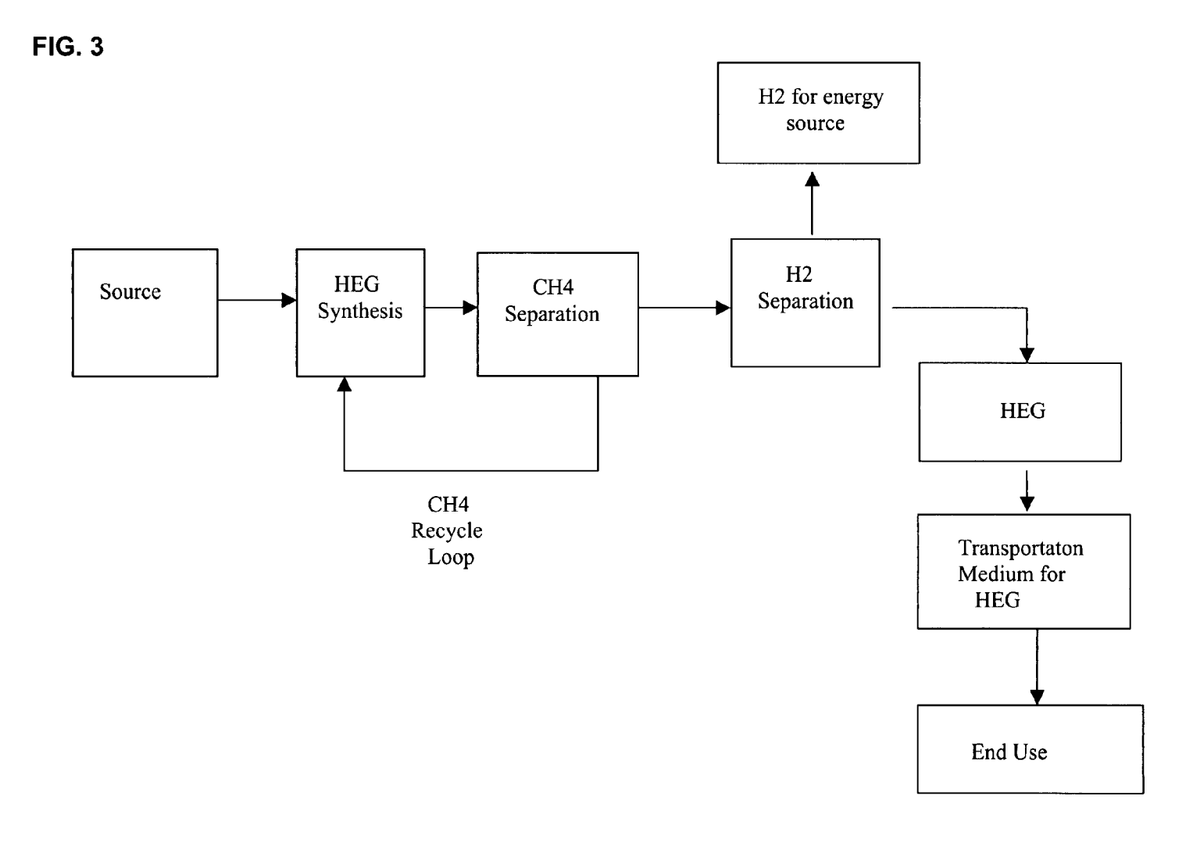
FIG. 3 is a flow diagram for high energy gas (HEG) transport with methane recycling and hydrogen separation

This invention can use variations to transport energy. The flow chart of FIG. 2 shows a variation that separates out hydrogen after the HEG synthesis and transports mixtures of methane and HEG. The separated hydrogen can be used as an energy source to generate electricity or for fuel for motor vehicles. The flow chart of FIG. 3 shows a variation where some or all the methane can be separated from the products of the HEG synthesis and recycled back into the HEG synthesis process to create HEGs. After separating out the methane, hydrogen is removed from the HEG prior to transportation.

Figure 4:
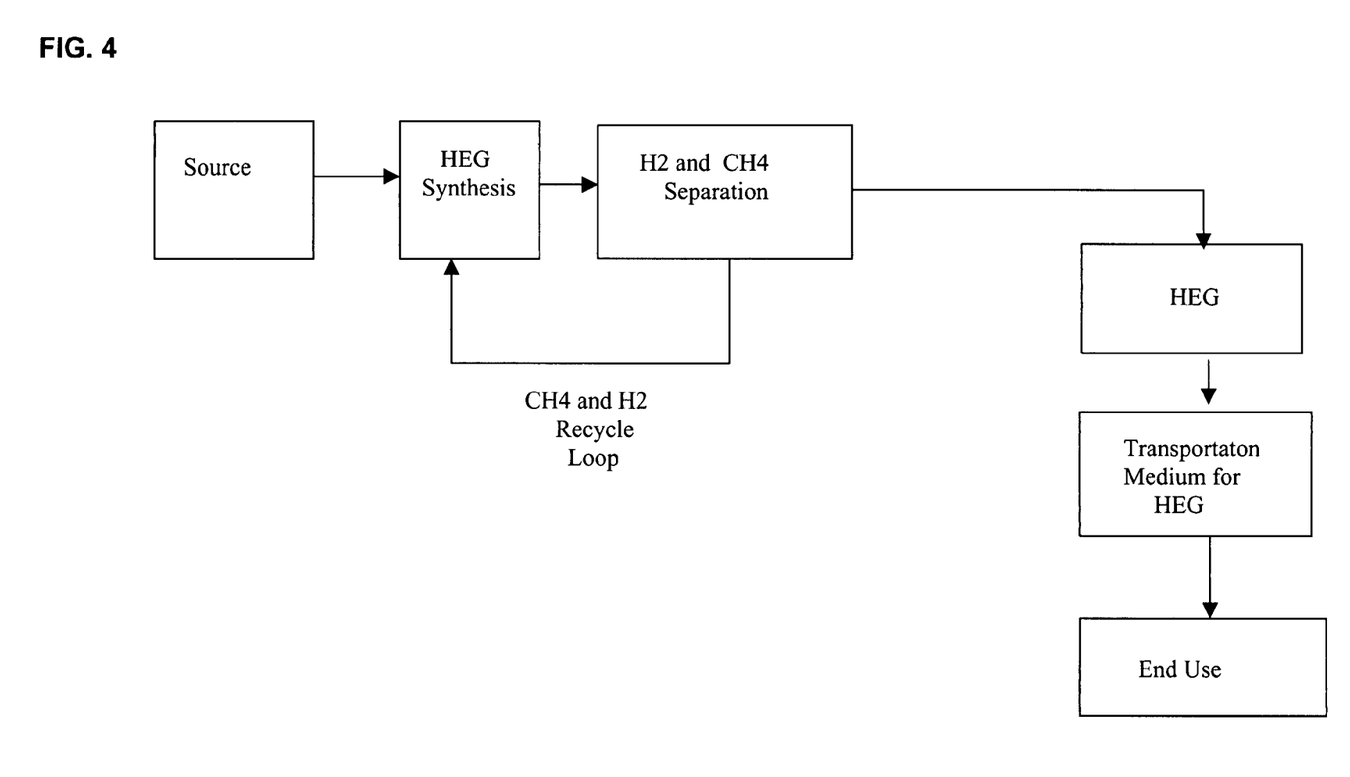
FIG. 4 is a flow diagram for high energy gas (HEG) transport with methane and hydrogen recycling.
Figure 5:
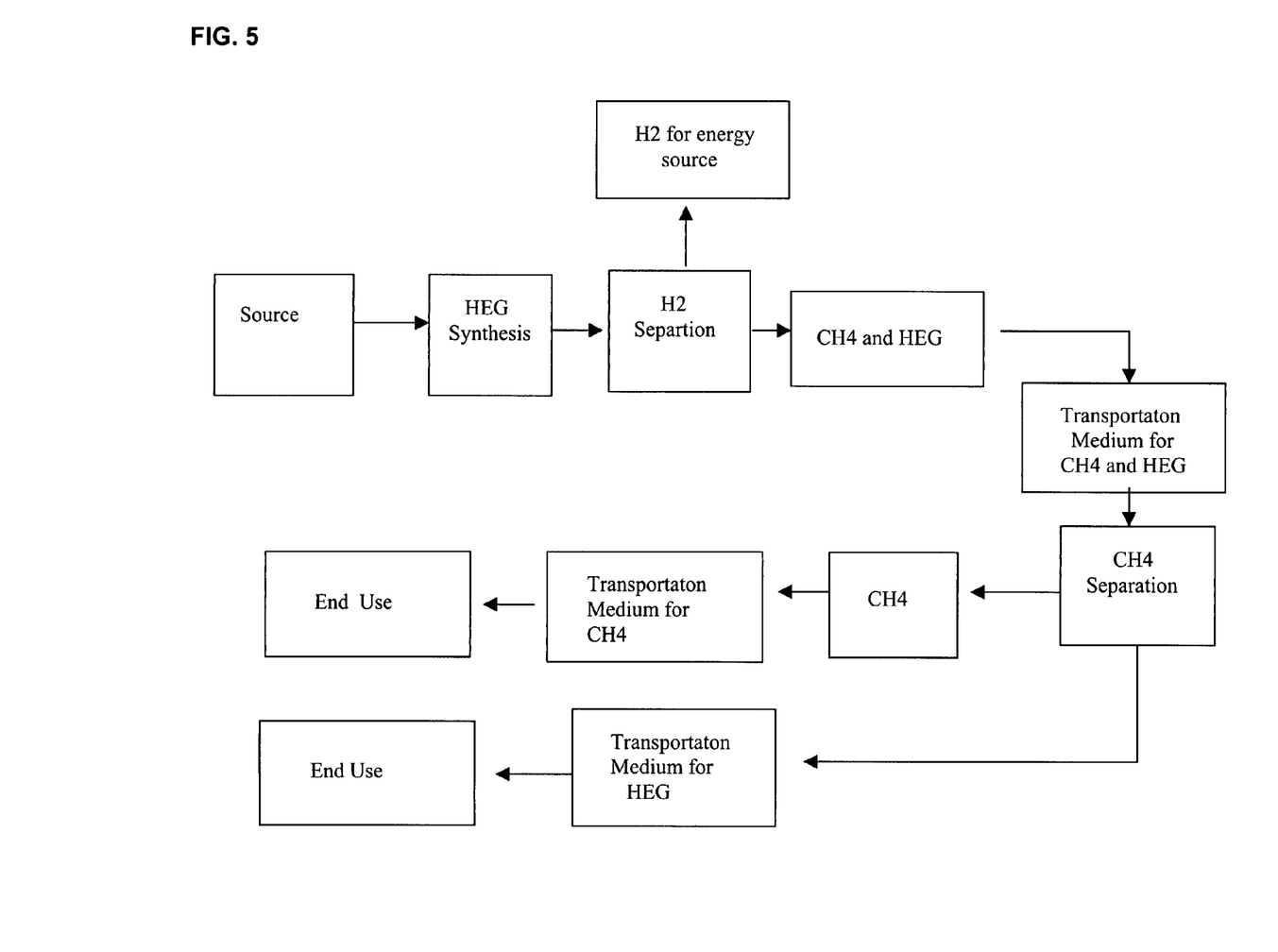
FIG. 5 is a flow diagram for high energy gas (HEG) transport with hydrogen separation and down the pipe separation of methane and high energy gases.

The flow chart of FIG. 4 illustrates a process where some or all of the hydrogen and some or all of the methane are separated from the product of the HEG synthesis method and recycled back into the HEG synthesis process. The HEG or HEG mixture is then transported to the end use. The flow chart of FIG. 5 shows a process where hydrogen is separated from the product stream after the HEG synthesis process. Methane and HEG are transported together. At a further time in the transmission of the mixture, some or all of the methane can be separated out of the transmission method for an intended end use. For example, methane ($CH_4$) can be separated from the mixture for home heating while the remaining mixture of methane and HEG is used for electricity generation. While not shown in FIGS. 2 through 5, it should be understood that in the scope of the invention the HEGs could be mixed with methane during the transmission.

Figure 6:
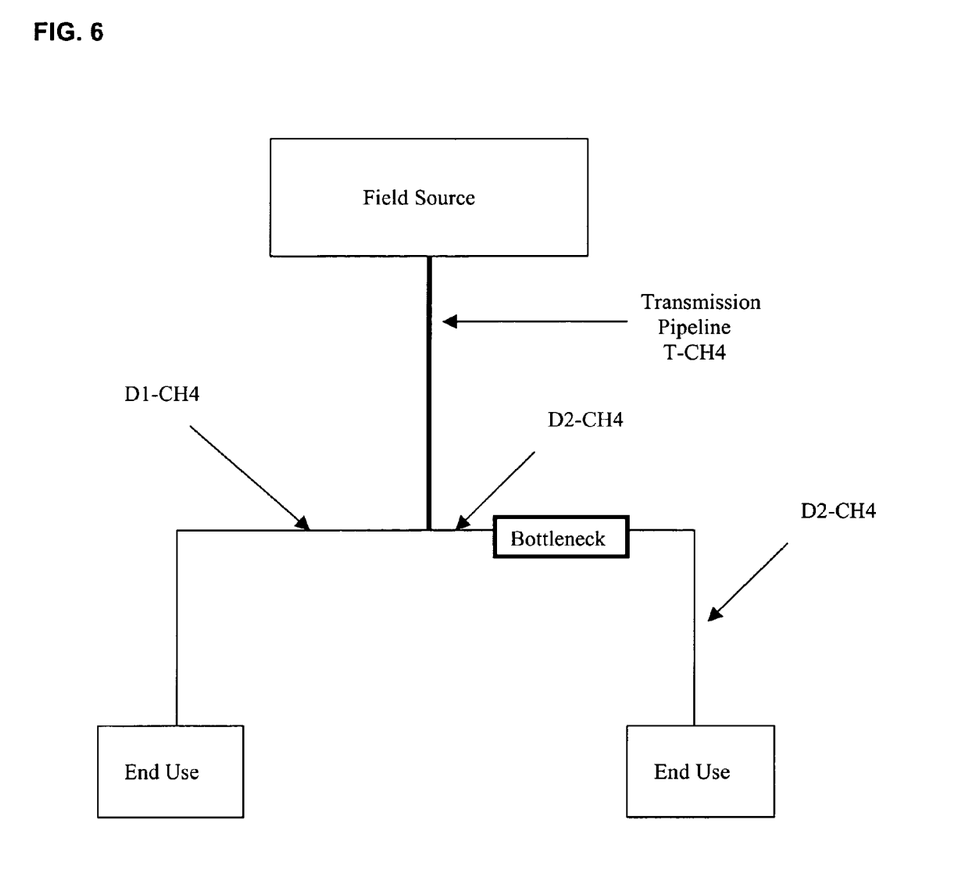
FIG. 6 is a flow diagram depicting a bottleneck in a distribution line for methane.

Another benefit of this invention is that bottlenecks in transmission pipelines and distribution pipelines can be eliminated. This invention allows for satellite operations for HEG synthesis to relieve bottlenecks in transportation of energy. The invention would allow move energy to be transmitted to the end uses without having to construct a new pipeline. As shown in the flow chart of FIG. 6, a transmission pipeline T-CH4 carries methane to two (2) distribution pipelines D1-CH4 and D2-CH4, both carrying methane. A bottleneck is present in D2-CH4 that prevents the end use from receiving the amount of energy that is required at the end use.

Figure 7:
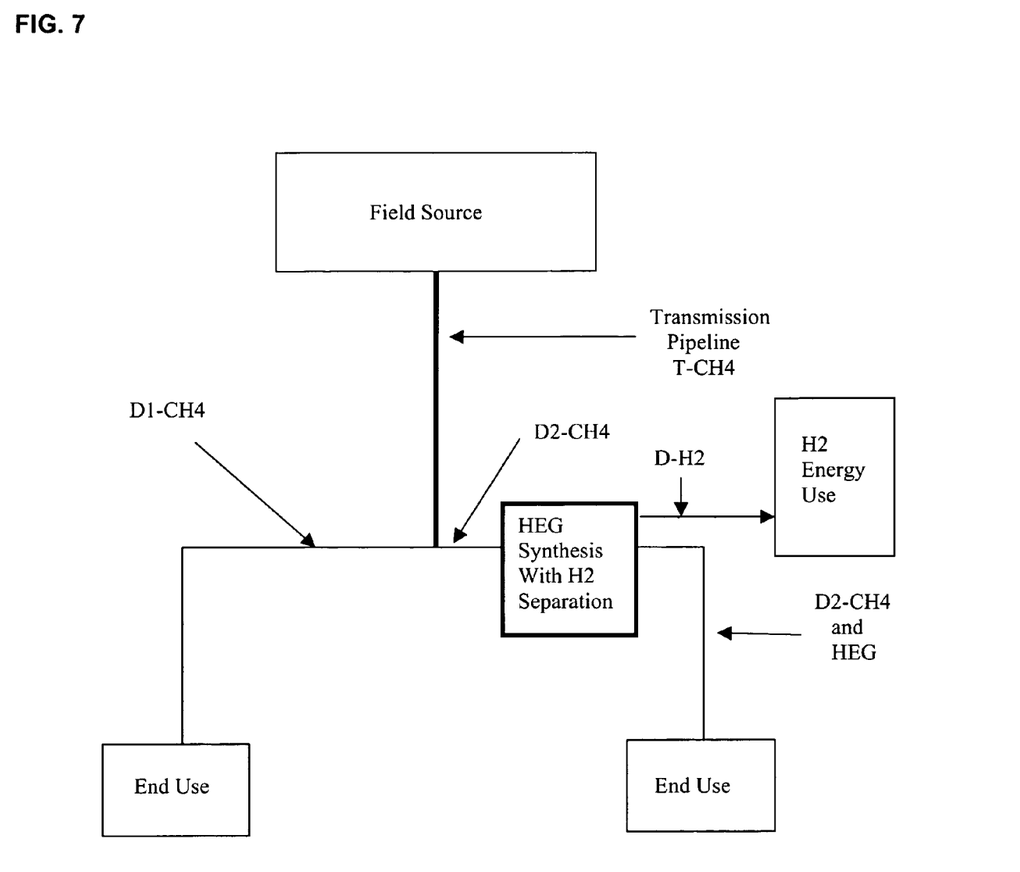
FIG. 7 is a flow diagram depicting the application of high energy gas (HEG) synthesis to remove a bottleneck in a distribution line for methane.

As shown in the flow chart of FIG. 7, the HEG method is used to alleviate the bottleneck in D2-CH4 by providing more energy. Through the invention, the bottleneck is eliminated. After the HEG synthesis process, distribution pipeline line D2-CH4 now carries a mixture of methane and HEG. The distribution pipeline after the HEG synthesis is label D2-CH4 and HEG because it carries more energy from this energy transportation method. Construction of additional distribution pipelines was not required to meet the energy demands of the end use. Also shown in FIG. 7, hydrogen is separated after the HEG synthesis process. As an example, the hydrogen could be used as an energy source for motor vehicles or to generate electricity from a fuel cell.

Figure 8:
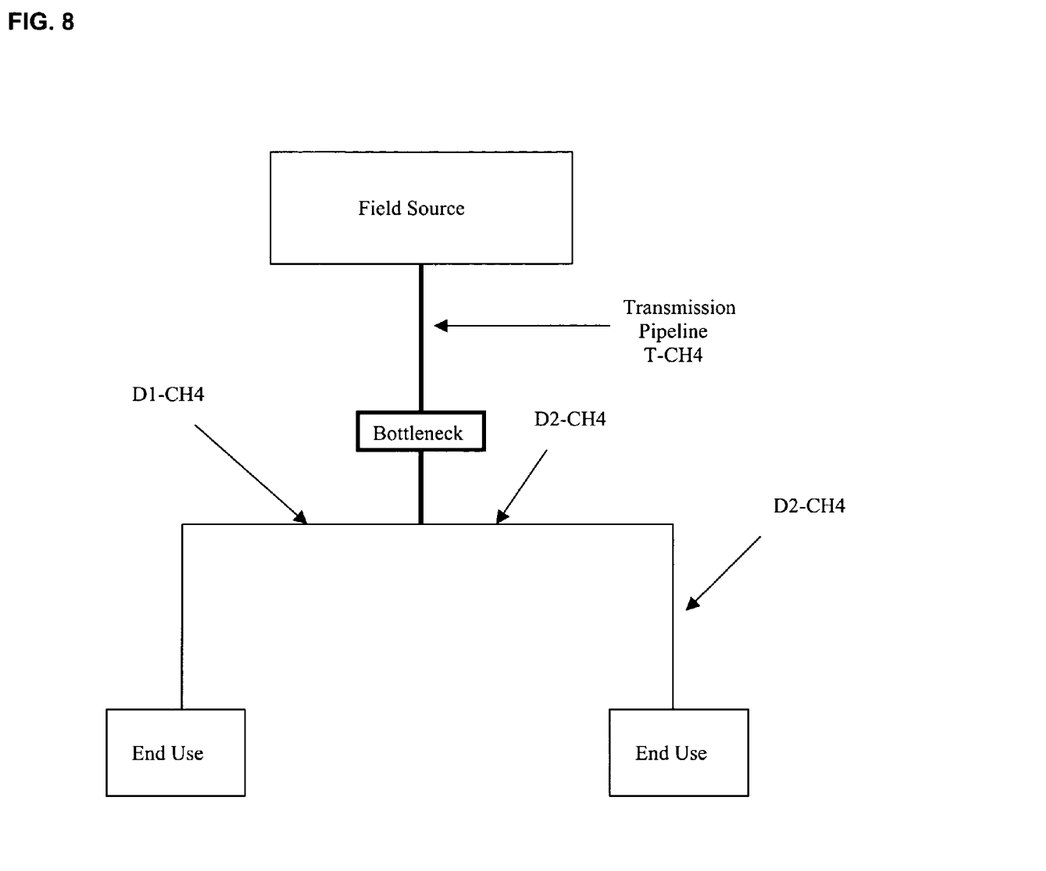
FIG. 8 is a flow diagram depicting a bottleneck in a transmission line for methane.
Figure 9:
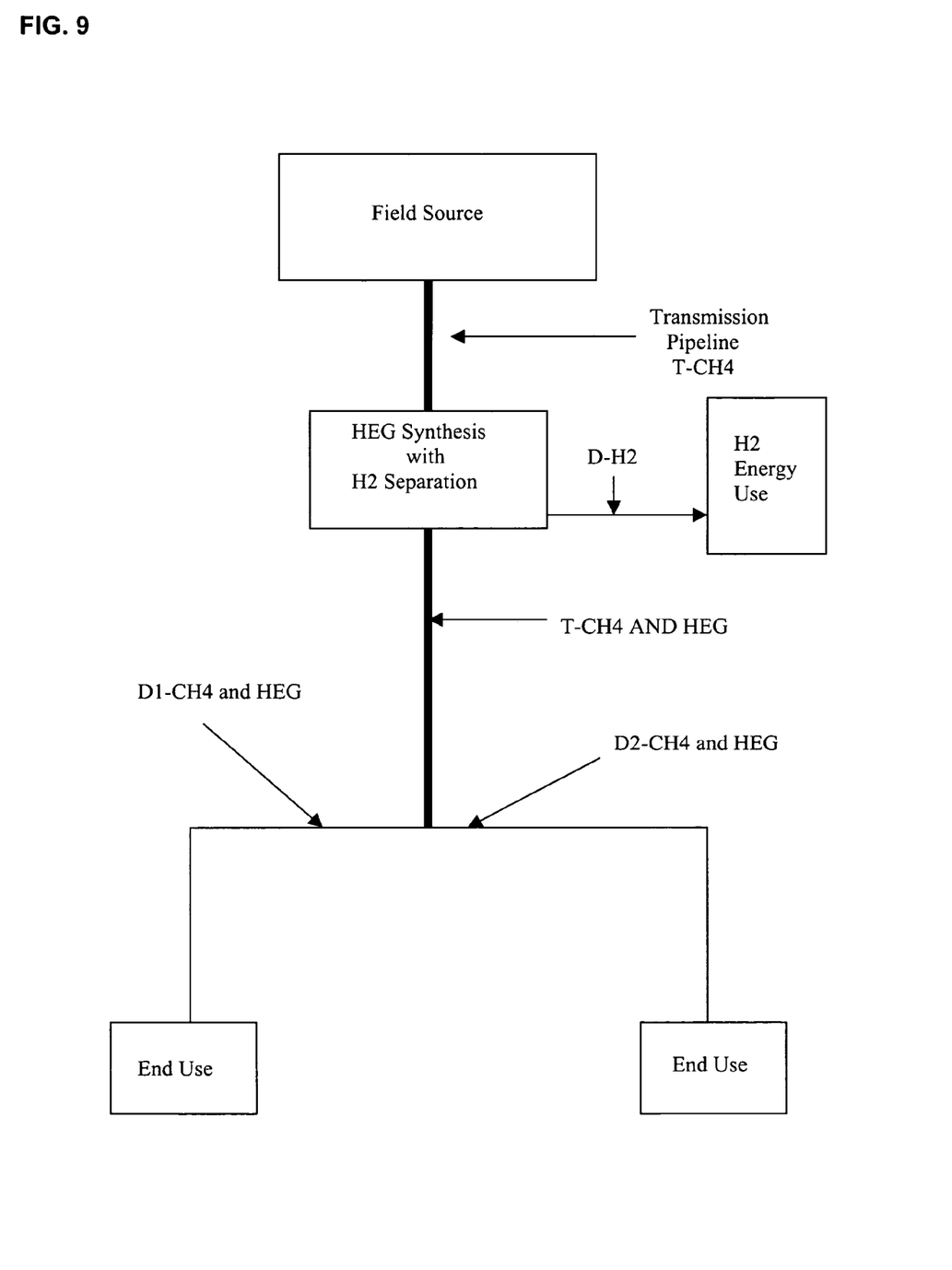
FIG. 9 is a flow diagram depicting the application of high energy gas (HEG) synthesis to remove a bottleneck in a transmission line for methane.

As shown in the flow chart of FIG. 8, a bottleneck is present in transmission pipeline T-CH4. T-CH4 carries methane only. As shown in the flow chart of FIG. 9, the bottleneck is eliminated by using the HEG method to transport a higher energy capacity through the transmission pipeline. Prior to HEG synthesis the transmission pipeline T-CH4 carried methane only. After HEG synthesis, the transmission pipeline now carries more energy to meet the demands of the end use. The transmission pipeline is labeled T-CH4 and HEG because it now carries a mixture of HEGs and methane. Likewise, the two (2) distribution pipelines are now relabeled, because they both carry a mixture of methane and HEGs. One is relabeled D1-CH4 and HEG. The other one is relabeled D2-CH4 and HEG. FIG. 9 also depicts a hydrogen separation process. The hydrogen can be use as an energy source for electricity generation or as a fuel for motor vehicles.

New regulations (deregulation) for electricity transmission and sale of electricity allow for this invention to use abundant and unused excess energy that is available in the US at night from nuclear-powered and coal-powered electricity generation. Unlike energy from electricity, energy from gases can be readily stored at great quantities for later use when demand is great. For example, high energy gases can be synthesized at night with excess electricity available at night and stored for a later use.

The above description sets forth the best mode of the invention as known to the inventor at this time, and is for illustrative purposes only, as one skilled in the art will be able to make modifications to these methods without departing from the spirit and scope of the invention and its equivalents as set forth in the appended claims.

What is claimed is:

1. A method to transport energy comprising the steps of:
   a) providing an input chemical species comprising:
      (i) at least one gas species containing carbon, wherein the species containing carbon is selected from the group consisting of coal, activated carbon, char, biomass, and combinations thereof, and
      (ii) a component selected from the group consisting of methane, hydrogen, water, a solid species containing carbon, and combinations thereof, and the input species having a heat of combustion equal to or less than methane;
   b) converting at least a portion of the input chemical species using a reforming process into an output chemical species that has at least one new gaseous species having a higher heat of combustion than methane, the output chemical species consisting of a chemical species selected from the group consisting of hydrogen, methane, acetylene, ethane, ethylene, propylene, and combinations thereof, wherein the total number of moles of the input chemical species is greater than the total number of moles of the output chemical species minus the number moles of hydrogen in the output chemical species, with the proviso that the output chemical species does not contain CO or $CO_2$, and wherein the heat of combustion of carbon is maintained in the reformed species without producing carbon monoxide or carbon dioxide;
   c) optimizing the reforming process to produce hydrogen gas;
   d) separating the hydrogen gas from the output chemical species to form a high energy transport gas;
   e) recycling the hydrogen separated from the output chemical species back into the input chemical species for reforming;
   f) separating methane from the output chemical species and recycling the methane back into the input chemical species for reforming; and
   g) transporting the high energy transport gas by conventional transportation means to an end use,
   wherein the process is optimized to maximize total heat of combustion of the high energy transport gas.

2. The method to transport energy as claimed in claim 1, wherein the method is employed to reduce a bottleneck in a transmission pipeline or a distribution pipeline.

3. The method to transport energy as claimed in claim 1, wherein the hydrogen separated from the output chemical species is used as an energy source to generate electricity or to fuel a motor vehicle.

4. The method to transport energy as claimed in claim 1, wherein the output chemical species has a heat of combustion greater than acetylene.

5. The method to transport energy as claimed in claim 4, wherein a portion of the output chemical species having a heat of combustion equal to or greater than acetylene is separated from the output chemical species and is recycled back into the input chemical species.

6. A high energy transport gas derived from the steps of:
   a) providing an input chemical species comprising (i) at least one gas species containing carbon and (ii) a component selected from the group consisting of methane, hydrogen, water, a solid species containing carbon, and combinations thereof, and the input chemical species having a heat of combustion equal to or less than methane;
   b) converting at least a portion of the input chemical species flow using a reforming process into an output chemical species that has at least one new gaseous species having a higher heat of combustion than methane, the output chemical species consisting of a chemical species selected from the group consisting of hydrogen, methane, acetylene, ethane, ethylene, propylene, and combinations thereof, with the proviso that the output chemical species does not contain CO or $CO_2$,
   c) optimizing the reforming process to produce hydrogen gas;
   d) separating the hydrogen gas from the output chemical species to form the high energy transport gas;
   e) recycling the hydrogen separated from the output chemical species back into the input chemical species for reforming; and
   f) separating methane from the output chemical species and recycling the methane back into the input chemical species for reforming,
   wherein the total number of moles of the input chemical species is greater than the total number of moles of the output chemical species minus the number moles of hydrogen in the output chemical species, and
   wherein the hydrogen is separated from the output chemical species prior to the high energy transport gas being transported by conventional means to an end use.

7. The high energy transport gas as claimed in claim 6, wherein the species containing carbon is selected from the group consisting of coal, activated carbon, char, biomass, and combinations thereof.

8. The high energy transport gas as claimed in claim 7, wherein the high energy transport gas is optimized to maximize total heat of combustion of the high energy transport gas.

9. The high energy transport gas as claimed in claim 8, wherein the high energy transport gas is employed to reduce a bottleneck in a transmission pipeline or a distribution pipeline.

10. The high energy transport gas as claimed in claim 8, wherein the hydrogen separated from the output chemical species is used as an energy source to generate electricity or to fuel a motor vehicle.

11. The high energy transport gas as claimed in claim 8, wherein the high energy transport gas has a heat of combustion greater than acetylene.

12. A high energy transport gas derived from the steps of:
   a) providing an input gas species comprising (i) a component selected from the group consisting of methane, hydrogen, water, a species containing carbon, and combinations thereof, and (ii) at least one species containing carbon, the input gas species having a heat of combustion equal to or less than methane;
   b) converting at least a portion of the input chemical species using a reforming process into an output chemical species that has at least one new gaseous species having a higher heat of combustion than methane, the output chemical species consisting of a chemical species selected from the group consisting of hydrogen, methane, acetylene, ethane, ethylene, propylene, and combinations thereof, with the proviso that the output chemical species does not contain CO or $CO_2$; and
   c) optimizing the process to produce hydrogen gas,
   d) separating the hydrogen gas from the output chemical species to form the high energy transport gas;
   e) recycling the hydrogen separated from the output chemical species back into the input chemical species for reforming; and
   f) separating methane from the output chemical species and recycling the methane back into the input chemical species for reforming, wherein the total number of moles of the input chemical species is greater than the total number of moles of the output chemical species minus the number moles of hydrogen in the output chemical species, wherein the output chemical species has a higher heat of combustion than methane, wherein the high energy transport gas is optimized to maximize total heat of combustion of the high energy transport gas, and wherein the high energy transport gas has a heat of combustion greater than acetylene.

13. The high energy transport gas as claimed in claim 12, wherein the species containing carbon is a solid selected from the group consisting of coal, activated carbon, char, biomass, and combinations thereof.

14. The high energy transport gas as claimed in claim 13, wherein the hydrogen is separated from the output chemical species to form the high energy transport gas prior to the high energy transport gas being transported by conventional means to an end use.

15. The high energy transport gas as claimed in claim 14, wherein the high energy transport gas is employed to reduce a bottleneck in a transmission pipeline or a distribution pipeline.

16. The high energy transport gas as claimed in claim 14, wherein the hydrogen separated from the output chemical species is used as an energy source to generate electricity or to fuel a motor vehicle.

* * * * *